US008805833B2

(12) United States Patent
Nath et al.

(10) Patent No.: US 8,805,833 B2
(45) Date of Patent: Aug. 12, 2014

(54) ENHANCING PERSONAL DATA SEARCH WITH INFORMATION FROM SOCIAL NETWORKS

(75) Inventors: Suman Kumar Nath, Redmond, WA (US); Douglas Christopher Burger, Redmond, WA (US)

(73) Assignee: Microsoft Corp., Redmond, WA (US)

( * ) Notice: Subject to any disclaimer, the term of this patent is extended or adjusted under 35 U.S.C. 154(b) by 372 days.

(21) Appl. No.: 12/954,247

(22) Filed: Nov. 24, 2010

(65) Prior Publication Data
US 2012/0131009 A1 May 24, 2012

(51) Int. Cl.
*G06F 17/30* (2006.01)
(52) U.S. Cl.
USPC .......................... 707/736; 707/707; 707/709
(58) Field of Classification Search
USPC .................. 707/709, 711, 723, 741, 707, 736
See application file for complete search history.

(56) References Cited

U.S. PATENT DOCUMENTS

| 2007/0112761 A1* | 5/2007 | Xu et al. ........................... 707/5 |
| 2008/0005064 A1 | 1/2008 | Sarukkai |
| 2008/0301112 A1* | 12/2008 | Wu .................................... 707/5 |
| 2009/0043789 A1 | 2/2009 | Gupta |
| 2009/0043799 A1* | 2/2009 | Morris ........................... 707/102 |
| 2009/0044144 A1* | 2/2009 | Morris ........................... 715/804 |
| 2009/0164929 A1* | 6/2009 | Chen et al. .................... 715/769 |
| 2009/0204599 A1* | 8/2009 | Morris et al. .................... 707/5 |
| 2009/0307205 A1 | 12/2009 | Churchill et al. |
| 2010/0125604 A1 | 5/2010 | Martinez et al. |

OTHER PUBLICATIONS

Chirita, et al., "Activity Based Metadata for Semantic Desktop Search", Retrieved at << http://citeseerx.ist.psu.edu/viewdoc/download?doi=10.1.1.59.5100&rep=rep1&type=pdf >>, Lecture Notes in Computer Science : The Semantic Web: Research and Applications, Second European Semantic Web Conference, May 29-Jun. 1, 2005, pp. 1-15.

Chirita, et al., "PTAG: Large Scale Automatic Generation of Personalized Annotation TAGs for the Web", Retrieved at << http://citeseerx.ist.psu.edu/viewdoc/download?doi=10.1.1.81.128&rep=rep1&type=pdf >>, Proceedings of the 16th international conference on World Wide Web, May 8-12, 2007, pp. 845-854.

Hunter, et al., "HarvANA-Harvesting Community Tags to Enrich Collection Metadata", Retrieved at << http://elec.uq.edu.au/~agerber/papers/JCDL2008.pdf >>, Proceedings of the 8th ACM/IEEE-CS joint conference on Digital libraries, Jun. 16-20, 2008, pp. 147-156.

(Continued)

*Primary Examiner* — Dennis Truong
(74) *Attorney, Agent, or Firm* — Dan Choi; Carole Boelitz; Micky Minhas

(57) ABSTRACT

The personal data search technique uses data input by users for a given user's personal data on a social networking site to enrich the given user's personal data. The technique annotates personal data stored on a personal computing device or in a computing cloud with data obtained from social networking sites (for example, tags, comments, likes/dislikes and so forth) provided by friends/other users in the given user's social network or networks. Such annotations can later are used by search engine to enhance the search functionality and/or to improve the ranking of search results. Since the data is entered by actual human users it is very accurate and since the data is already readily available on social networks the cost to obtain it is very inexpensive.

20 Claims, 5 Drawing Sheets

(56) References Cited

OTHER PUBLICATIONS

Lerman, et al., "Personalizing Image Search Results on Flickr", Retrieved at << http://arxiv.org/PS_cache/arxiv/pdf/0704/0704.1676v1.pdf >>, Apr. 12, 2007, pp. 11.

Nejdl, et al., "Desktop Search—How Contextual Information Influences Search Results & Rankings", Retrieved at << http://projectory.org/Arbeiten/Publikationen/2005/Irix.pdf >>, In Proceedings of the IRIX Workshop At SIGIR, 2005, pp. 4.

* cited by examiner

ENHANCING PERSONAL DATA SEARCH WITH INFORMATION FROM SOCIAL NETWORKS

BACKGROUND

Finding personal data such as audio, video and image files on one's personal computing device can be difficult. This is especially true for files that a user has created. In most cases when a user uploads his personal image and audio files to his personal computing device, he does not bother to annotate his files with metadata that can serve to locate his files on his computing device using a search engine. This is because annotating such data files by hand is time consuming and tedious.

It is possible to locate and identify the content of a file by using content-based analysis. However, content-based search of multimedia data such as photographs, audio and video files is often slow and unreliable due to computationally expensive and inaccurate content analysis algorithms.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The personal data search technique described herein annotates a given user's personal data stored on a personal computing device or in a personal computing cloud with data obtained from one or more social networking sites (for example, tags including any identifying text that might be added, comments, likes/dislikes, and other annotations) that is provided by other users of the social networking site/sites (e.g., friends). Such annotations can later be used by a search engine to enhance the search functionality and/or to improve the ranking of search results when a user is searching his personal data in his personal computing device or cloud.

In one embodiment, the technique assists a given user in finding his personal data on his personal computing device. To this end, various metadata (e.g., comments, tags, likes, etc.) provided by social network users (e.g., the given user's friends) is obtained from the social network. The given user's personal data on the social network is matched to the given user's personal data stored on their personal computing device (e.g., desktop or laptop computer, media player, smart phone) and the information provided by the other users is extracted. The information provided by the other users of the social network is attached to, or associated with, the given user's personal data stored on the user's personal computing device so that it can be used to locate the user's personal data stored on the user's personal computing device. When the given user issues a query to search for his personal data on his personal computing device the information provided by the other users associated with the given user's personal data is used to return the user's personal data to the given user. The information provided by the other users can also be used to rank the given user's returned personal data.

In another embodiment, the technique assists a given user in finding his personal data in a personal computing cloud. To this end, information provided by users of a social network on the given user's personal data located on a social network is obtained. The given user's personal data on the social network is matched to his personal data stored on his personal computing cloud and the information provided by the other users is extracted. The information provided by users is attached to, or associated with, the given user's personal data stored on the user's personal cloud so that the information provided by the other users can be used to locate the user's personal data stored on the user's personal computing cloud. When the given user issues a query to search for his personal data on his personal computing cloud, the information provided by the other users is used to return the user's personal data to the user by matching query terms to the information provided by the other users of the social network. The information provided by the other users can be used to rank the returned search results.

It should be noted that while the present technique is generally described with respect to annotation data provided by users of a social network on a given user's personal data stored on the social network, this technique can be extended to any other on-line services where users annotate another user's data.

DESCRIPTION OF THE DRAWINGS

The specific features, aspects, and advantages of the disclosure will become better understood with regard to the following description, appended claims, and accompanying drawings where:

DETAILED DESCRIPTION

Figure 1:
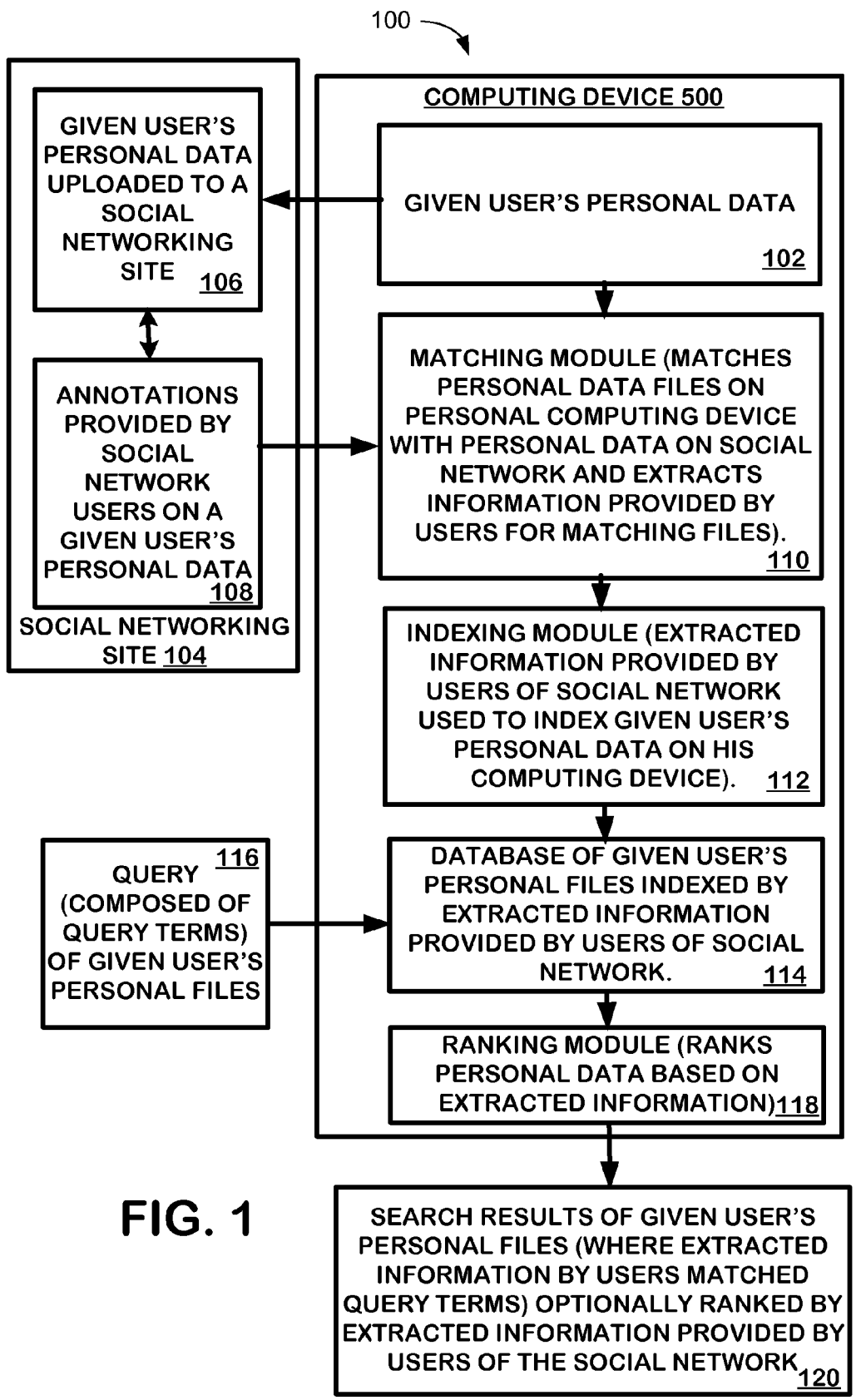
FIG. 1 depicts a schematic of an exemplary architecture for employing one embodiment of the personal data search technique where personal data is stored on a given user's personal computing device.

In the following description of the personal data search technique, reference is made to the accompanying drawings, which form a part thereof, and which show by way of illustration examples by which the personal data search technique described herein may be practiced. It is to be understood that other embodiments may be utilized and structural changes may be made without departing from the scope of the claimed subject matter.

1.0 Personal Data Search Technique

The following sections provide background information, an overview of the personal data search technique, as well as architectures and processes for practicing the technique.

1.1 Background

Currently most search engines allow a user to search for his personal data, especially non-text data such as image data or audio data, by using the file name, file type and directory name of the data file. For example, a search query for "Yellowstone" will typically return a given file only if there are files with names such as "yellowstone1.jpg". If the user is searching for an image file of a person named Alice at Yellowstone National Park, a search on the keyword "Alice" will probably not return the desired image file.

More advanced search techniques analyze the content of files. For example, image processing can be performed to identify people and objects in an image file. Content analysis may find that a photograph contains "Alice" or an audio file contains a rock song. However, content-based search on multimedia data such as pictures, audio and video files is often expensive and unreliable due to computationally expensive and inaccurate content analysis algorithms. This is especially true for personal data (e.g., data stored on one's laptop, desktop, personal cloud, etc.) Desktop search engines typically need an index of keywords describing the content of a multimedia file in order to find a file based on its content. In most applications to date, humans must associate tags to multimedia data in order to provide data with which a search for the content of multimedia files can be performed. Additionally, content based analysis cannot capture the popularity of a file for the purposes of ranking results returned in response to a search query. Human beings are much more accurate in tagging the content of multimedia files than content-based analysis techniques.

1.2 Overview of the Technique

The personal data search technique described herein relates to searching for personal data such as photographs, songs, text and video stored on a user's personal computing device or in a personal computing cloud.

A suitable computing device 500 for practicing one embodiment of the technique is described in greater detail later with respect to FIG. 5.

A computing cloud can be defined as a network with various computing devices, storage devices, and ancillary devices attached there to. A computing cloud offers shared resources, software, and information to computers and other devices (such as smart phones) on demand over the Internet. A personal computing cloud is a physical or virtual partition of a computing cloud such that the partition stores a user's personal data, allows access to the data by the user, and isolates the data from any unauthorized users.

The personal data search technique described herein uses data input by users of a social network for a given user's personal data on a social networking site to enrich the given user's personal data. The technique uses this data input by other users to make it easier for the given user to find and rank his personal data in response to a search query. The technique annotates personal data stored on a given user's personal computing device or in his personal computing cloud with data obtained from one or more social networking sites provided by other users in the given user's social network or networks. Such annotations can later be used by a search engine to enhance the search functionality and/or to improve the ranking of search results for the user's personal data.

Since the annotation data used by the technique is entered by actual human users it is very accurate. Additionally, since the annotation data is readily available on social networks the cost to obtain it is very inexpensive. For example, the technique can crawl a given user's space (e.g., website) on a social network and gather tags, comments, likes/dislikes posted by other users on data the given user has uploaded to his space (e.g., website) on the social networking site.

It should be noted that while this disclosure generally describes the present technique with respect to annotation data provided by users of a social network on a given user's personal data stored on the social network, this technique can be extended to other on-line services where users annotate another user's data.

1.3 Exemplary Architectures

FIG. 1 depicts an exemplary architecture 100 for employing one embodiment of the personal data search technique described herein. As shown in FIG. 1, a given user uploads his personal data (block 102) from his computing device to a social networking site (block 104). Other users of the social network provide other information on the given user's personal data (e.g., they provide comments, like/dislike indications and other annotations) as shown in blocks 106, 108. The information provided by the other users on the given user's personal data located on the social network is found and extracted (as shown in block 108). For example, this information provided by users can be found by using a web crawler to crawl one or more social networking sites. The user's personal data on the social network (block 106) is matched to the same personal data (block 102) stored on his personal computing device 500, using a matching module 110. For example, matching can be performed based on file name or various heuristics of the personal data on the social networking site and on the given user's computing device. Signatures associated with the file on the social network and on the file on the personal computing device can also be used to match files. For example, such a signature could be effectively a hash of key data, so in a photo, for example, the pixels themselves can be hashed, but if other parts of the file change (like the last date modified) the files will still be seen as identical. Once a match is found, the information provided by the other users on the given user's personal data can be used to index the personal data for use with a personal search engine (block 112). The information provided by the other users to the given user's personal data, attached to, or associated with, the given user's personal data, is stored in a database (block 114) on the user's personal computing device 500 so that the information provided by the other users can be used to locate the given user's personal data stored on his personal computing device. For example, the given user can enter a query (block 116) into a search engine to search for his personal data on his computing device and use the information provided by the other users to return the given user's personal data to the given user (as shown in block 120). The information provided by the other users of the social network can also be used to rank the given user's personal data returned to the given user in response to the search query in a ranking module 118. For example, the information provided by users of the social network typically includes whether these users like or dislike a piece of personal data that the given user has posted to the social network. The technique can then use these likes and dislikes to rank higher personal data that is liked.

Figure 2:
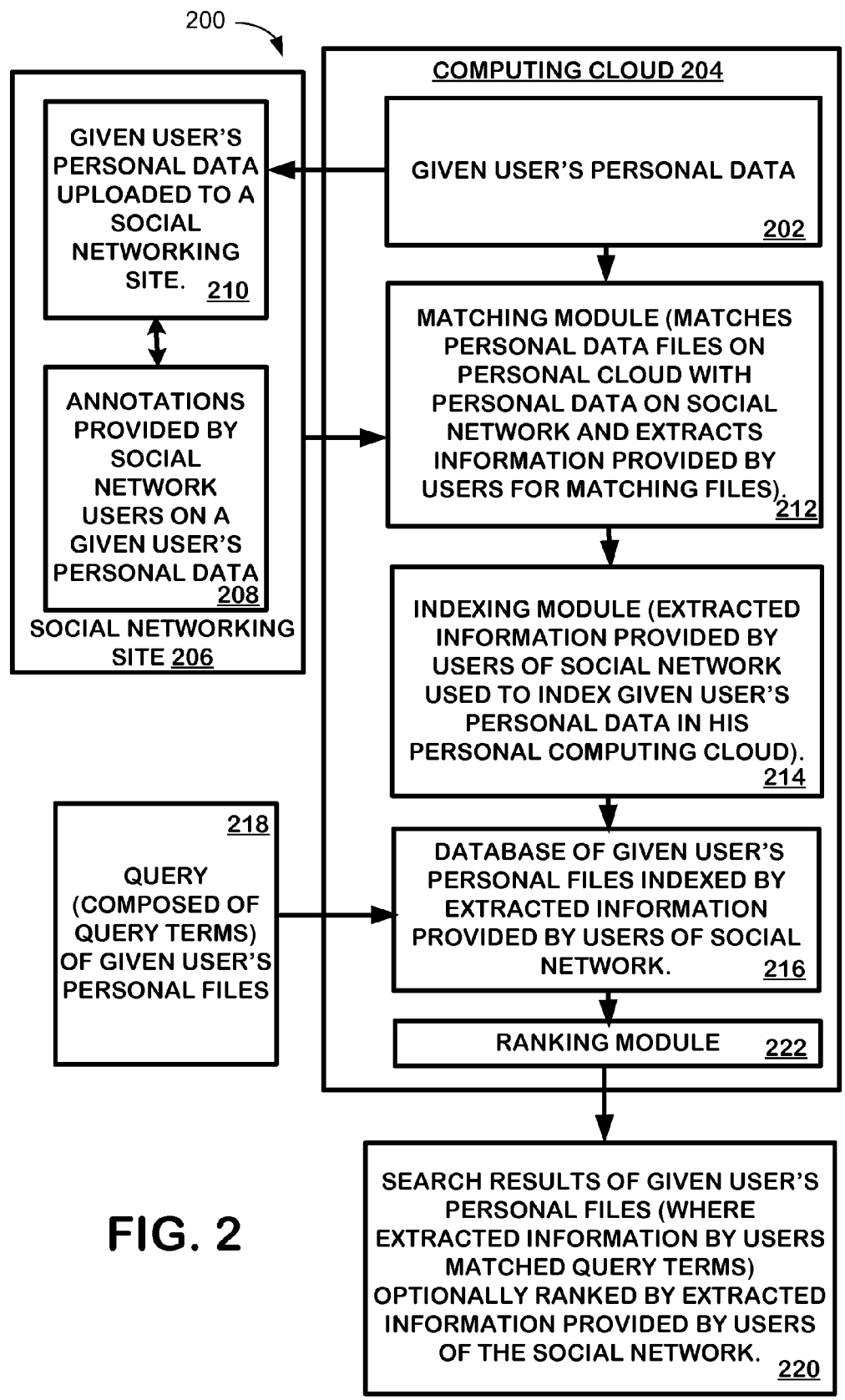
FIG. 2 depicts a schematic of an exemplary architecture for employing another embodiment of the personal data search technique where personal data is stored on a given user's personal computing cloud.

FIG. 2 depicts another exemplary architecture 200 for employing the personal data search technique described herein. In this embodiment, the given user's personal data is stored in a personal computing cloud (block 204). As shown in FIG. 2, a given user uploads his personal data (block 202) from his personal computing cloud (block 204) to a social networking site (or perhaps other on-line service) (block 206). Other users of the social networking site (or perhaps users of other on-line services) provide other information (block 208) on the given user's personal data on the personal computing cloud (for example, they can provide comments, like/dislike indications and other annotations). Information provided by the other users on the given user's personal data located on the social network (or perhaps other on-line service) (block 206) is thus located and extracted. For example, this information provided by users can be found by using a web crawler to crawl one or more social networking sites to find and extract the information provided by the other users of the social network. The information provided by users of the social network for the given user's personal data on the social network (or other on-line service) (block 208) is matched to the same personal data stored in his personal computing cloud (block 204), using a matching module 212. Matching can be performed based on file name or by using various heuristics of the personal data (block 210) on the social networking site or sites and on the given user's personal computing cloud (block 204). The information provided by the other users can be used to index the given user's personal data (block 202) for use with a personal search engine in an indexing module 214. The information provided by the other users of the social networking site (or other on-line service) to the given user's personal data, attached to or associated with the given user's personal data, is stored in a database (block 216) on the user's personal computing cloud (block 204) so that the information provided by the other users can be used to locate the user's personal data stored on the user's personal computing cloud. For example, the given user can enter a query (block 218) into a search engine to search for his personal computing device and use the information provided by the other users attached to, or associated with, the given user's personal data to return the given user's personal data to the given user (as shown in block 220). The information provided by the other users can also be used to rank the personal data returned to the given user in response to the search query in a ranking module 222. For example, the technique can use user likes and dislikes to rank personal data that is liked by the users of the social network more frequently higher.

1.4 Exemplary Processes for Employing the Personal Data Search Technique

Figure 3:
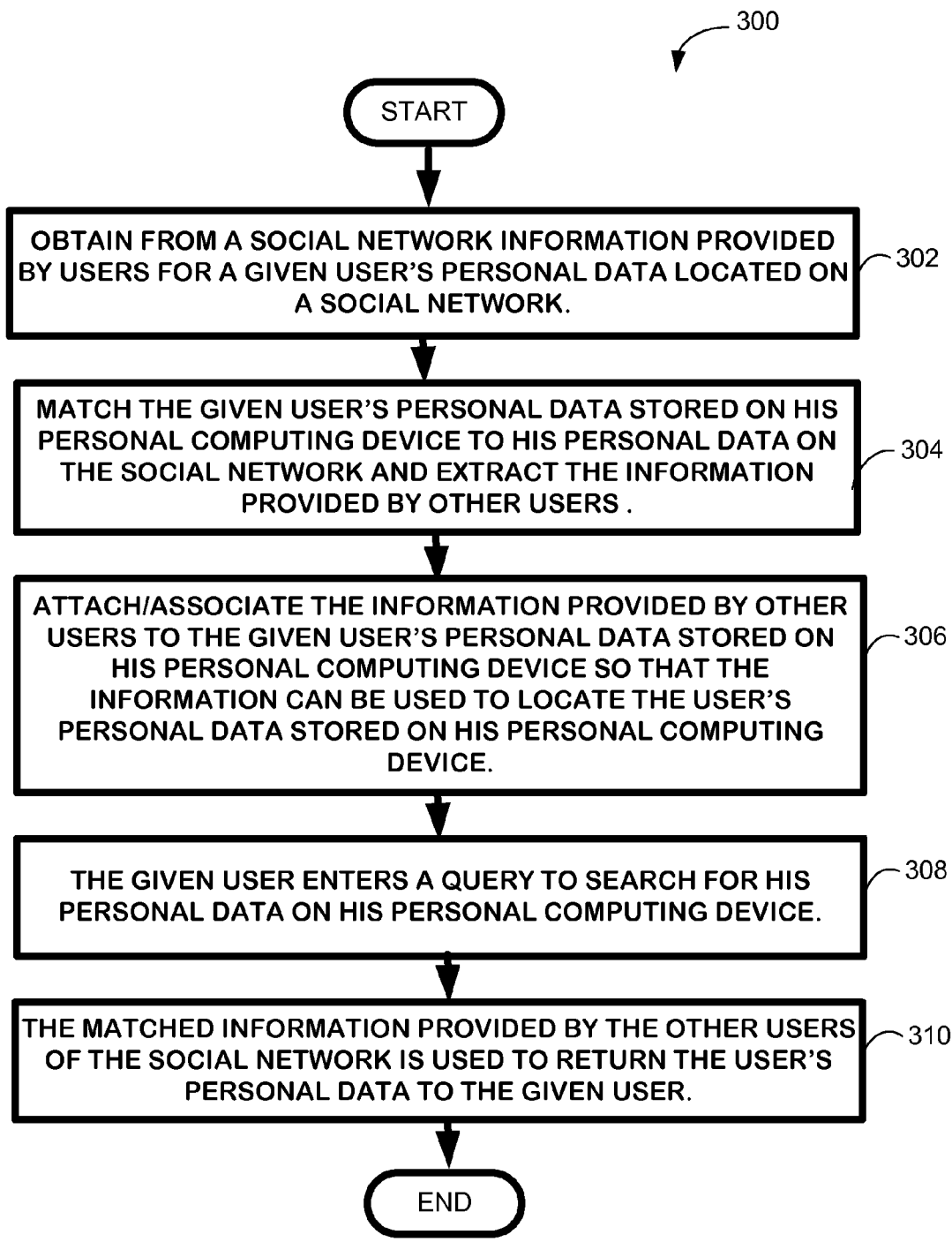
FIG. 3 depicts a flow diagram of an exemplary process for employing one embodiment of the personal data search technique where the personal data is stored on a given user's computing device.
Figure 4:
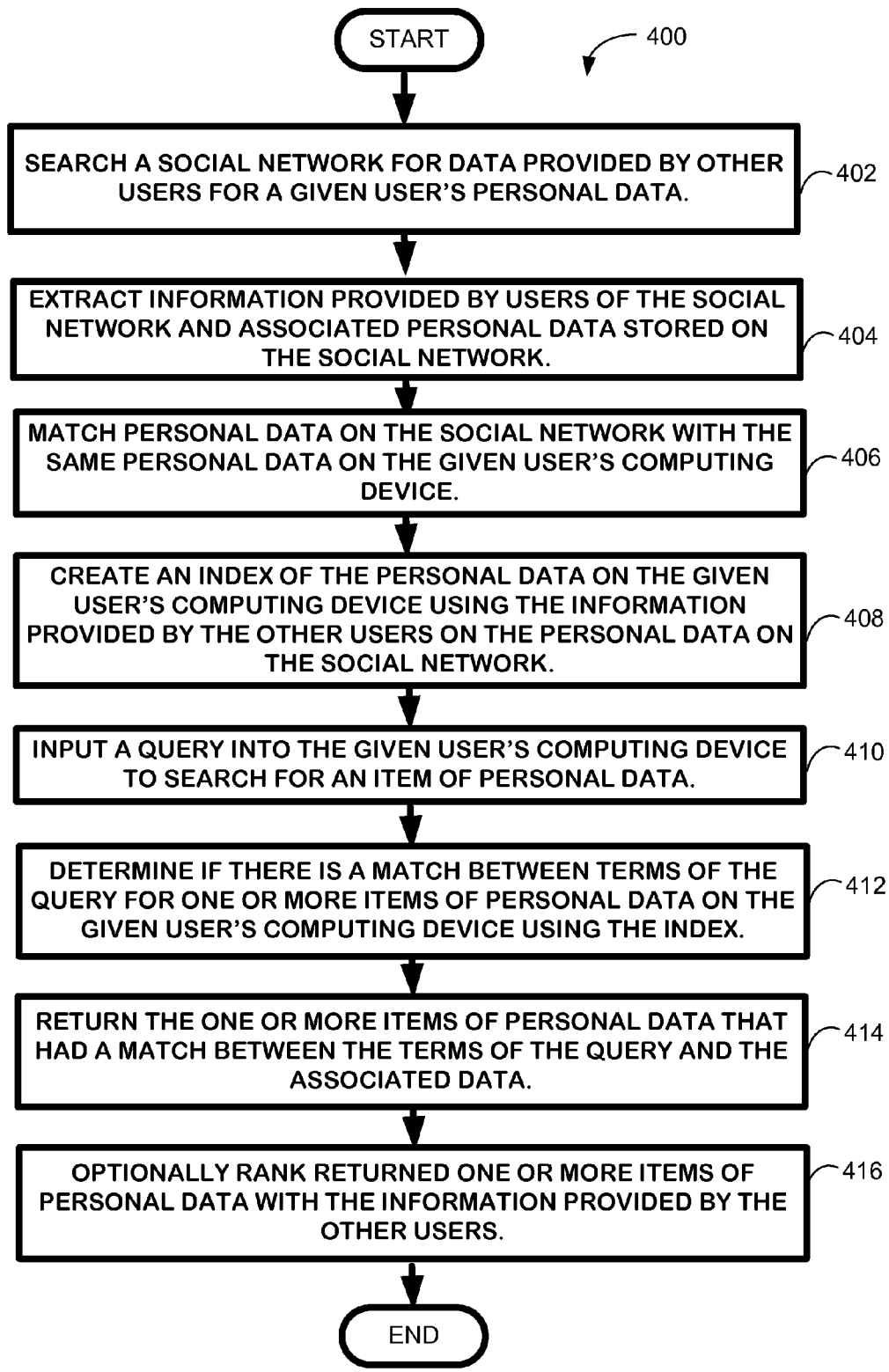
FIG. 4 depicts a flow diagram of another exemplary process for employing the personal data search technique where the personal data is stored in a given user's personal cloud.

FIGS. 3 and 4 and the following paragraphs provide descriptions of exemplary processes 300, 400 for practicing the personal data search technique described herein. It should be understood that in some cases the order of actions can be interchanged, and in some cases some of the actions may even be omitted.

FIG. 3 provides a flow diagram for retrieving a given user's personal data from his personal computing device. As shown in FIG. 3, block 302, social network information provided by users on a given user's personal data located on the given user's space (e.g. website) on a social network is obtained. This information by other users can include, for example, comments posted on the given user's image or audio files, likes and dislikes posted and other information. The given user's personal data can include, for example, image files, video files, text data, audio files and so forth.

As shown in block 304, the given user's personal data on the social network is matched to the given user's personal data stored on his personal computing device. This personal computing device can be, for example, a personal or laptop computer, smart phone, media player or similar device. The matching can be done by matching the file name of the given user's personal data on the social network to the filename of the personal data on the given user's computing device if the same file names are used to identify the same items of personal data on the social network and on the given user's personal computing device. Alternately, this matching can be performed by matching the file of the user's personal data on the social network to the file of the personal data on the user's computing device by matching the content of the files if the same file names are not used to identify the same items of personal data on the social network and on the user's personal computing device. Various conventional file matching techniques can be used to determine whether two files are the same file (e.g., color histogramming and matching, file size matching). Once the given user's personal data on the social networking site and the given user's personal data on the computing device have been matched, the information provided by the other users of the social networking site is extracted.

The extracted information provided by the other users is attached to, or associated with, the given user's personal data stored on the user's personal computing device so that this information can be used to locate the user's personal data stored on the user's personal computing device, as shown in block 306.

When the given user enters a query to search for his personal data on his personal computing device (block 308) the information provided by the other users attached to, or associated with, the given user's personal data is used to return the user's personal data to the user (block 310).

FIG. 4 depicts another exemplary embodiment 400 for employing the personal data search technique where the given user's personal data is stored on a personal computing cloud. As shown in block 402, a social network is searched for data provided by other users for a given user's personal data (for example, an image file, video file or an audio file). For example, as discussed previously, this data provided by others can be obtained by crawling social networking sites with a web crawler.

The information provided by other users and the associated personal data stored on the social network is then extracted, as shown in block 404. As shown in block 406, the personal data on the social network is matched with the same personal data on the given user's personal cloud. This can be done for each of the given user's personal data files on the social networking site and on the user's personal computing cloud. This matching can be done by matching the file name of the social networking site with the file name of the given user's personal computing cloud. Or if the file names are not the same, the matching can be performed by matching the content of the file on the social networking site with the content of the file on the given user's personal computing cloud to establish that the two files are the same. Various conventional techniques can be used to determine whether the file on the user's personal computing cloud and the file on the social network are the same file.

Once the it is determined that a file on the given user's personal space on the social networking site is the same as that on the given user's personal computing cloud, an index of the personal data on the given user's personal computing cloud is created with the associated personal data extracted for the file from the social networking site, as shown in block 408.

A query can then be entered into the given user's personal search engine on the given user's personal computing cloud to search for an item of personal data, as shown in block 410, and it is determined if there is a match between terms of the query for one or more items of personal data on the given user's personal computing cloud using the index, as shown in block 412.

The matched items of personal data can then also be ranked (block 414) and the one or more ranked items of personal data that had a match between the terms of the query and the associated data from the social networking site can be returned to the user (block 416). For example, the ranking can be executed so that a matched item of personal data is ranked higher when the user-provided data indicates that the users rated that particular item of personal data highly.

2.0 The Computing Environment

The personal data search technique is designed to operate in a computing environment. The following description is intended to provide a brief, general description of a suitable computing environment in which the personal data search technique can be implemented. The technique is operational with numerous general purpose or special purpose computing system environments or configurations. Examples of well-known computing systems, environments, and/or configurations that may be suitable include, but are not limited to, personal computers, server computers, hand-held or laptop devices (for example, media players, notebook computers, cellular phones, personal data assistants, voice recorders), multiprocessor systems, microprocessor-based systems, set top boxes, programmable consumer electronics, network PCs, minicomputers, mainframe computers, distributed computing environments that include any of the above systems or devices, and the like.

Figure 5:
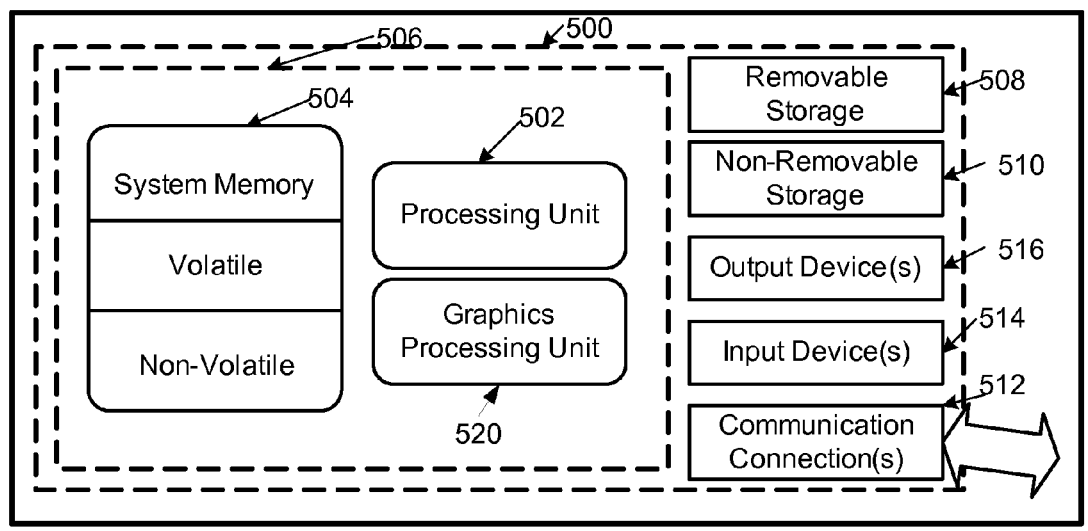
FIG. 5 is a schematic of an exemplary computing device which can be used to practice the personal data search technique.

FIG. 5 illustrates an example of a suitable computing system environment. The computing system environment is only one example of a suitable computing environment and is not intended to suggest any limitation as to the scope of use or functionality of the present technique. Neither should the computing environment be interpreted as having any dependency or requirement relating to any one or combination of components illustrated in the exemplary operating environment. With reference to FIG. 5, an exemplary system for implementing the personal data search technique includes a computing device, such as computing device 500. In its most basic configuration, computing device 500 typically includes at least one processing unit 502 and memory 504. Depending on the exact configuration and type of computing device, memory 504 may be volatile (such as RAM), non-volatile (such as ROM, flash memory, etc.) or some combination of the two. This most basic configuration is illustrated in FIG. 5 by dashed line 506. Additionally, device 500 may also have additional features/functionality. For example, device 500 may also include additional storage (removable and/or non-removable) including, but not limited to, magnetic or optical disks or tape. Such additional storage is illustrated in FIG. 5 by removable storage 508 and non-removable storage 510. Computer storage media includes volatile and nonvolatile, removable and non-removable media implemented in any method or technology for storage of information such as computer readable instructions, data structures, program modules or other data. Memory 504, removable storage 508 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 500. Computer readable media include both transitory, propagating signals and computer (readable) storage media. Any such computer storage media may be part of device 500.

Device 500 also can contain communications connection(s) 512 that allow the device to communicate with other devices and networks. Communications connection(s) 512 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal, thereby changing the configuration or state of the receiving device of the signal. By way of example, and not limitation, communication media includes wired media such as a wired network or direct-wired connection, and wireless media such as acoustic, RF, infrared and other wireless media. The term computer readable media as used herein includes both storage media and communication media.

Device 500 may have various input device(s) 514 such as a display, keyboard, mouse, pen, camera, touch input device, and so on. Output device(s) 516 devices such as a display, speakers, a printer, and so on may also be included. All of these devices are well known in the art and need not be discussed at length here.

The personal data search technique may be described in the general context of computer-executable instructions, such as program modules, being executed by a computing device. Generally, program modules include routines, programs, objects, components, data structures, and so on, that perform particular tasks or implement particular abstract data types. The personal data search technique may be practiced in distributed computing environments where tasks are performed by remote processing devices that are linked through a communications network. In a distributed computing environment, program modules may be located in both local and remote computer storage media including memory storage devices. Still further, the aforementioned instructions could be implemented, in part or in whole, as hardware logic circuits, which may or may not include a processor.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

What is claimed is:

1. A computer-implemented process for annotating personal data, comprising:
    obtaining from a social network application information explicitly provided by users of the social network application on a given user's personal data located on the social network created by the social network application;
    matching the given user's personal data stored on the given user's personal computing device to the given user's personal data located on the social network and extracting the information provided by users of the social network application;
    attaching the extracted information provided by users of the social network application to the matched user's personal data stored on the user's personal computing device so that the extracted information provided by the other users of the social network application can be used to locate the user's personal data stored on the user's personal computing device.

2. The computer-implemented process of claim 1, further comprising:
    the given user entering a query to search for his personal data on the given user's personal computing device; and
    using the matched information attached to the given user's personal data to return the user's personal data to the given user.

3. The computer-implemented process of claim 1, wherein the matched information is used to index the personal data for use by a search engine.

4. The computer-implemented process of claim 1, wherein the matched information is used to rank the given user's personal data returned to the given user in response to the search query.

5. The computer-implemented process of claim 4, wherein the returned search results are ranked by how highly users of the social network rated the given user's personal data in the information provided by the users.

6. The computer-implemented process of claim 1, wherein the information provided by users is obtained by crawling the given user's space on the social network created by the social network application with a web crawler.

7. The computer-implemented process of claim 1, wherein the matching of the information provided by users to the given user's personal data further comprises matching the file name of the given user's personal data on the social network to the filename of the personal data on the given user's computing device if the same file names are used to identify the same items of personal data on the social network and on the given user's personal computing device.

8. The computer-implemented process of claim 1, wherein the matching of the information provided by users to the given user's personal data further comprises, matching the file of the user's personal data on the social network to the file of the personal data on the user's computing device by matching the content of the files if the same file names are not used to identify the same items of personal data on the social network and on the user's personal computing device.

9. A computer-implemented process for searching for personal data stored on a user's computing device, comprising:
   searching a social network created by a social network application for data provided by other users of the social network application for a given user's personal data;
   extracting the information provided by other users and associated personal data stored on the social network created by the social network application;
   matching the extracted information provided by other users of the social network application and associated personal data on the social network created by the social network application with the same personal data on the given user's computing device;
   creating an index of the personal data on the given user's computing device with the associated personal data using the extracted information provided by the other users of the social network application;
   inputting a query into the given user's computing device to search for an item of personal data on the user's computing device;
   determining if there is a match between terms of the query for one or more items of personal data on the given user's computing device using the index;
   ranking the matched items of personal data; and
   returning the one or more ranked items of personal data that had a match between the terms of the query and the associated data.

10. The computer-implemented process of claim 9, wherein the ranking further comprises ranking an item of personal data higher when the user-provided data indicates that the users rated the personal data highly.

11. The computer-implemented process of claim 9, wherein the given user's personal data is an image file.

12. The computer-implemented process of claim 9, wherein the given user's personal data is an audio file.

13. A system for annotating personal data, comprising using two or more computing devices in a computing cloud, further comprising at least one processor comprising modules to:
   obtain from a social network created by a social network application information provided by users of the social network application on a given user's personal data located on the social network created by the social network application;
   match the given user's personal data stored on the given user's personal space in the computing cloud storage to the given user's personal data located on the social network and extracting the information provided by users of the social network application;
   attach the extracted information provided by users of the social network application to the matched user's personal data stored on the user's personal space in the computing cloud storage so that the extracted information can be used to locate the user's personal data stored on the user's personal space in the computing cloud storage.

14. The system of claim 13, further comprising:
   the given user entering a query into a personal search engine to search for his personal data on the user's personal space in the computing cloud; and
   using the matched information attached to the given user's personal data in the computing cloud to return the user's personal data to the given user.

15. The system of claim 13, wherein the matched information is used to index the personal data for use with a personal search engine.

16. The system of claim 13, wherein the matched information is used to rank the given user's personal data returned to the given user in response to the search query.

17. The system of claim 16, wherein the returned search results are ranked by how highly users of the social network ranked the given user's personal data in the information provided by the users.

18. The system of claim 13, wherein the matching of the information provided by users to the given user's personal data further comprises matching the file name of the user's personal data on the social network to the filename of the personal data on the user's personal space in the computing cloud if the same file names are used to identify the same items of personal data on the social network and on the user's personal space on the computing cloud.

19. The system of claim 13, wherein the matching of the information provided by users to the given user's personal data further comprises, matching the file of the user's personal data on the social network to the file of the personal data on the user's personal space in the computing cloud by making a comparison of the content if the same file names are not used to identify the same items of personal data on the social network and on the user's personal space on the computing cloud.

20. The computer-implemented process of claim 13 wherein the data provided by the users comprises at least one of the group comprising:
   tags;
   comments; and
   likes.

* * * * *